Jan. 28, 1941.　　　L. U. EYERLY　　　2,229,966
AMUSEMENT MACHINE
Filed Feb. 19, 1938　　　2 Sheets-Sheet 1
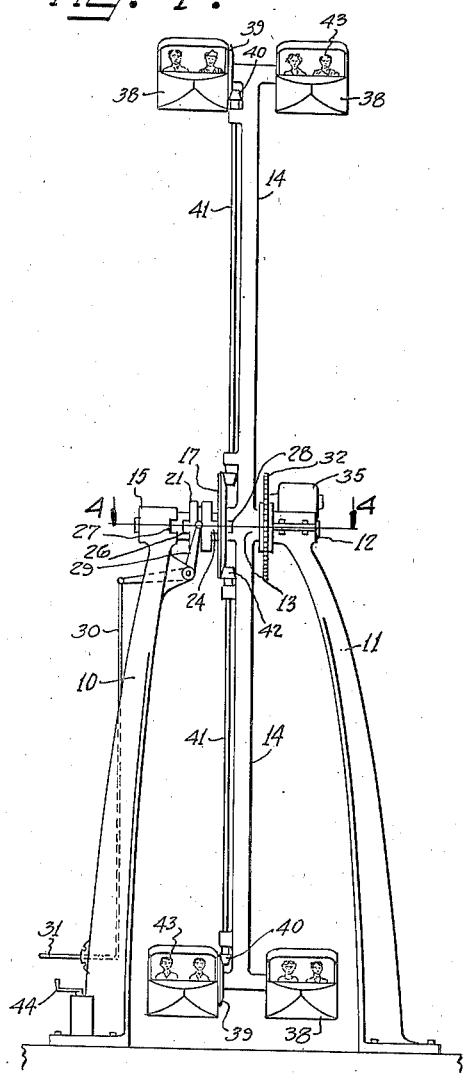
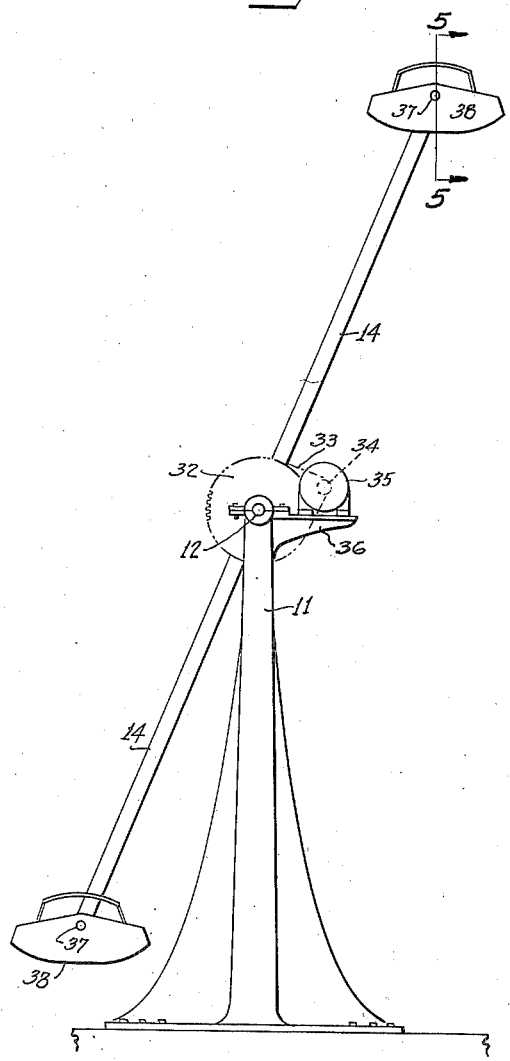
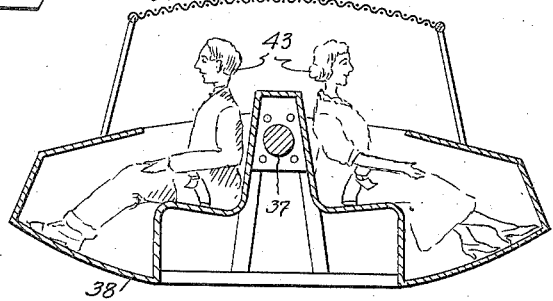
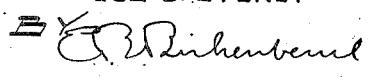
INVENTOR
LEE U. EYERLY
ATTORNEY Jan. 28, 1941.  L. U. EYERLY  2,229,966
AMUSEMENT MACHINE
Filed Feb. 19, 1938   2 Sheets-Sheet 2
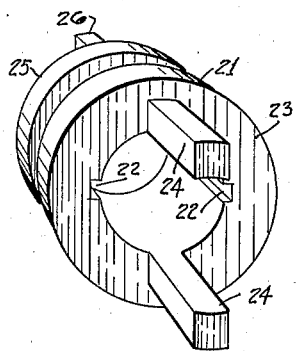
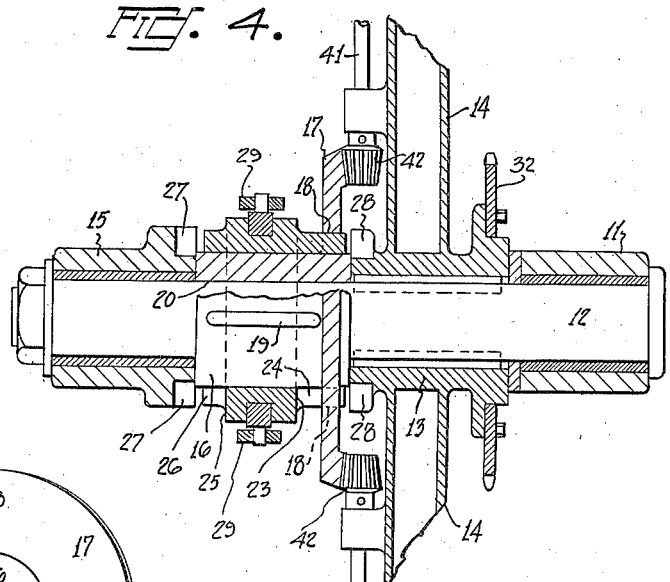
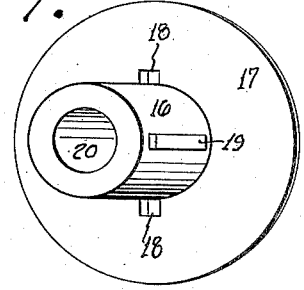
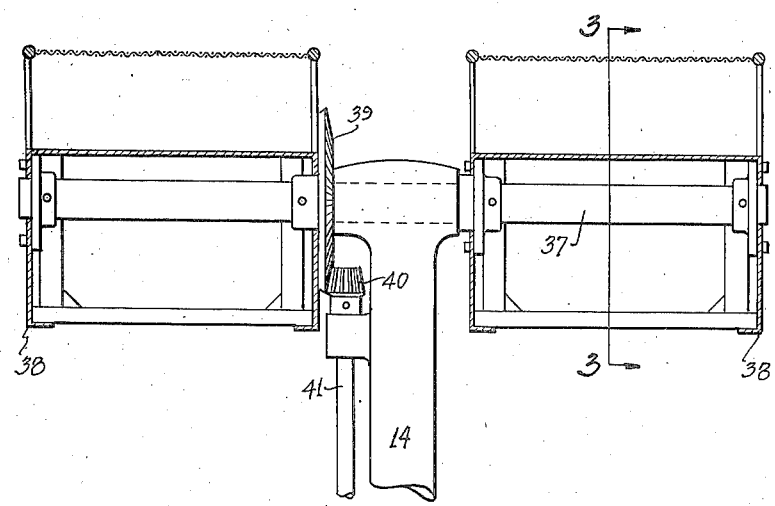
INVENTOR
LEE U. EYERLY
ATTORNEY Patented Jan. 28, 1941

2,229,966

UNITED STATES PATENT OFFICE 2,229,966

AMUSEMENT MACHINE

Lee U. Eyerly, Salem, Oreg.

Application February 19, 1938, Serial No. 191,492

3 Claims. (Cl. 272—38)

This invention relates generally to amusement devices, and particularly to an amusement machine of the Ferris wheel type.

The main object of this invention is the construction of an improved form of amusement machine in which the passengers are moved in a circular orbit in a vertical plane and can be made to revolve within this plane.

I accomplish this and other objects in the manner set forth in the following specification as illustrated in the accompanying drawings, in which:

Fig. 1 is a front elevation of the machine.

Fig. 2 is a side elevation.

Fig. 3 is a section taken through a car taken along the line 3—3 in Fig. 5.

Fig. 4 is a section taken along the line 4—4 in Fig. 1.

Fig. 5 is a section taken along the line 5—5 in Fig. 2.

Fig. 6 is a perspective view of the clutch collar.

Fig. 7 is a perspective view of the drive gear.

Similar numerals refer to similar parts throughout the several views.

Referring in detail to the drawings, there is shown a pair of standards 10 and 11 within which journal the horizontal shaft 12. On the shaft 12 is keyed the hub 13 from which project the radial arms 14.

Between the hub 13 and the bearing 15 of the standard 10 is disposed the hub 16 of the bevel gear 17. The gear 17 is provided with the diametrically opposite openings 18 which are close to the hub 16. The hub 16 is also provided with the splines 19. The opening 20 in the hub 16 is adapted to rotatably receive the shaft 12.

Slidably mounted on the hub 16 is a clutch collar 21 which is provided with the spline ways 22 adapted to receive the splines 19. Projecting from the side 23 of the clutch collar 21 are the jaws 24 which jaws extend through the openings 18. On the side 25 of the collar 21 are formed the short jaws 26 which are adapted to engage the slots 27 in the bearing 15 when the collar 21 is moved sufficiently in that direction.

The hub 13 is provided with slots 28 into which the jaws 24 can extend when the collar 21 is sufficiently moved in that direction. A forked bell crank lever 29 is pivotally mounted on the standard 10 and is operated through the connecting rod 30 from the hand lever 31. On the hub 13 is secured a sprocket wheel 32 which is driven through a chain 33 from the sprocket pinion 34 of the motor 35 which is mounted on the bracket 36 disposed at the upper end of the standard 11.

At the outer end of each arm 14 is disposed a transverse shaft 37 on each end of which is secured a car 38. Secured to the shaft 37 is a bevel gear 39 which meshes with a pinion 40 on the shaft 41 and on whose opposite end is secured the pinion 42 which meshes with the bevel gear 17.

The operation of the machine is as follows:

Assuming that passengers 43 occupy the cars 38 and that it is desired to give them a ride in the machine, the operator by manipulating the controller 44 of the motor 35 causes the motor 35 to operate and to revolve the arms 14 about the axis of the shaft 12, then by moving the lever 31 to the neutral position, shown in Fig. 1, for example, the cars 38 merely travel around in their orbits after the fashion of a Ferris wheel, that is, right side up.

If, however, the lever 31 is moved to cause the jaws 24 to engage the slots 28, it follows that the gear 17 will be locked with the hub 13 and the cars 38 will not be able to revolve about the axis of their respective shaft 37 but will revolve about the axis of the shaft 12.

If, on the other hand, the lever 31 is moved until the jaws 26 engage the slots 27, then the gear 17 is locked against any movement so that as the arms 14 revolve and the pinions 42 travel around the gear 17, rotation is imparted to the shafts 41 and the cars 38 are made to revolve about the axes of the shafts 37 in the same direction as they do about the axis of the shaft 12.

It must be understood that it would easily be possible to vary the ratio of the gear 17 and pinions 42 or to interpose gearing for the purpose of making the cars 38 revolve in opposite directions without departing from the spirit of this invention.

Attention is drawn to my United States Patents Nos. 1,987,004 and 2,046,678 over which this machine is an improvement.

I claim:

1. An amusement machine having an upright standard, a horizontal shaft journaled in said standard, a pair of radial arms attached to said shaft, means for revolving said shaft, a gear mounted on said shaft, means for securing said gear to said shaft, means for holding said shaft against rotation with relation to said standard, a car revolvably mounted on the outer end of each arm, and means for drivably connecting said gear to said car whereby said car may be permitted to swing from the end of its respective arm or to be revolved thereon or to be held in fixed relation thereto.

2. An amusement machine consisting of a pair of upright standards having a horizontal shaft journaled across the upper ends thereof, means for rotating said shaft, a pair of radial arms secured on said shaft, each of said arms having a car revolvably mounted on the outer end thereof on an axis normal to the plane of rotation of said arm, a gear associated with said shaft, a clutch mechanism for selectively locking said gear to said shaft or against rotation and driving connections between said gear and said cars.

3. In a machine of the class described the combination of a horizontal shaft, a pair of radial arms secured on said shaft, a gear revolvable on said shaft, a clutch collar slidable on the hub of said gear and having jaws on opposite sides thereof, one of said sets of jaws extending through said gear, said arms having a plurality of slots formed around the hub thereof adapted to receive said jaws, a second set of jaws on said slidable collar adapted to engage corresponding notches in a stationary member, a car revolvably mounted on the outer end of each arm and gearing interposed between said first mentioned gear and said car adapted to revolve same in the plane of rotation of said arms.

LEE U. EYERLY.